(12) United States Patent
Olier

(10) Patent No.: US 6,743,884 B2
(45) Date of Patent: Jun. 1, 2004

(54) DICARBOXY FUNCTIONALIZED SILICONE

(75) Inventor: Philippe Olier, Lyons (FR)

(73) Assignee: Rhodia Chimie, Boulogne Billancourt Cedex (FR)

(*) Notice: Subject to any disclaimer, the term of this patent is extended or adjusted under 35 U.S.C. 154(b) by 0 days.

(21) Appl. No.: 10/428,446

(22) Filed: May 2, 2003

(65) Prior Publication Data

US 2003/0212231 A1 Nov. 13, 2003

Related U.S. Application Data

(60) Provisional application No. 60/379,575, filed on May 9, 2002.

(51) Int. Cl.$^7$ .............................................. C08G 77/14
(52) U.S. Cl. ............................ 528/26; 528/15; 556/439
(58) Field of Search ...................... 528/26, 15; 556/439

(56) References Cited

U.S. PATENT DOCUMENTS

| | | | | |
|---|---|---|---|---|
| 2,723,987 A | * | 11/1955 | Speier | 556/439 |
| 2,805,237 A | * | 9/1957 | Kiffer et al. | 556/437 |
| 2,819,245 A | * | 1/1958 | Shorr | 528/27 |
| 3,265,623 A | * | 8/1966 | Pines et al. | 252/75 |
| 4,207,246 A | * | 6/1980 | Hafner et al. | 556/439 |
| 4,876,152 A | * | 10/1989 | Kang | 428/447 |

\* cited by examiner

*Primary Examiner*—Margaret G. Moore

(57) ABSTRACT

Dicarboxy functionalized polyorganosiloxanes having the formula $$X(R^4R^5SiO)_p(R^6ASiO)_qY \quad (I)$$

wherein the X end group represents a triorganosiloxyl end group of formula $R^1R^2R^3SiO$, or a Z end group, wherein Z represents —OH the Y end group represents a triorganosilyl end group of formula $SiR^3R^2R^1$, or a W end group, wherein W represents —H $R^1$ to $R^6$ represent a $C_1$–$C_8$ alkyl or phenyl radical, preferably methyl A represents the dicarboxy radical of formula (I') or salts thereof $$-(CH_2)_3-CH(COOH)-CH_2COOH \quad (I')$$

p is an average value ranging from 0 to 1000 q is an average value ranging from 1 to 100 the ratio of the number of Z and W end groups to the total number of X and Y end groups being from 0/100 to 75/100. They can be used for the water repellent treatment of surfaces, particularly inorganic surfaces or surfaces containing alkaline or earth-alkaline metal, and as anti-corrosion additives for the treatment of metal surfaces.

4 Claims, No Drawings

DICARBOXY FUNCTIONALIZED SILICONE

This application claims the benefit of provisional application No. 60/379,575 filed May 9, 2002.

The invention relates to dicarboxy functionalized polyorganosiloxanes; they can be used for the water repellent treatment of surfaces, particularly inorganic surfaces or surfaces containing alkaline or earth-alkaline metal; they can also be used as anti-corrosion additives for the treatment of metal surfaces.

Organofunctional silicones are well-known in the art. The siloxane units may be functonalized with substituents such as carboxyalkyl (EP-A-196 169; U.S. Pat. No. 5,702,490), carboxyalkylaminoalkyl (U.S. Pat. No. 5,516,869), carboxyetheralkyl (U.S. Pat. No. 4,658,049), with radicals derived from alkenyl succinic anhydride (U.S. Pat. No. 4,876,152) optionally amidated (U.S. Pat. No. 6,007,801) and can be used for the treatment of surfaces in various type of industries, such as metal, leather, personal care, plastics, masonry.

It has now been found that novel functionalized polyorganosiloxanes can be produced, and that such compounds are useful in the water repellent treatment of surfaces, particularly inorganic surfaces such as glass or surfaces containing alkaline or earth-alkaline metal, such as ceramics, tilings, walls, masonry . . . ; they can also be used as anti-corrosion additives for the treatment of metal surfaces.

The novel dicarboxy functionalized polyorganosiloxanes of the present invention have the formula (I)

$$X(R^4R^5SiO)_p(R^6A\,SiO)_qY \qquad (I)$$

wherein
the X end group represents
  a triorganosiloxyl end group of formula $R^1R^2R^3SiO$, or
  a Z end group, wherein Z represents —OH
the Y end group represents
  a triorganosilyl end group of formula Si $R^3R^2R^1$, or
  a W end group, wherein W represents —H
the symbols $R^1$ to $R^6$, which may be identical or different, represent a linear or branched $C_1$–$C_8$ alkyl or phenyl radical, preferably methyl
the symbol A represents the dicarboxy radical of formula

—(CH$_2$)$_3$—CH(COOH)—CH$_2$COOH or the alkali metal, earth alkali metal or ammonium salts thereof
p is an average value ranging from 0 to 1000, preferably from 0 to 500, more particularly from 5 to 200
q is an average value ranging from 1 to 100, preferably from 1 to 50
the ratio of the number of Z and W end groups to the total number of X and Y end groups being from 0/100 to 75/100, preferably from 0/100 to 30/100.

In a preferred embodiment, the p/q ratio is from 1/3 to 99/1, preferably from 1/1 to 10/1.

The salts of dicarboxy radical can be sodium, potassium, lithium, calcium, baryum salts, substituted or non substituted ammonium (methyl, dimethyl, trimethyl, tetramethylammonium, dimethylpiperidinium) salts.

The novel dicarboxy functionalized polyorganosiloxanes of the present invention can be obtained by hydrosilylation reaction of a polyalkylhydrogenosiloxane having the formula (II)

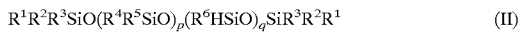

$$R^1R^2R^3SiO(R^4R^5SiO)_p(R^6HSiO)_qSiR^3R^2R^1 \qquad (II)$$

wherein the different symbols have the same meaning as above,
and allyl succinic anhydride with the aid of an effective amount of an hydrosilyation metal catalyst (platine), followed by hydrolysis reaction of the anhydride functions.

The hydrosilylation is a well-known reaction (U.S. Pat. Nos. 3,159,601; 3,159,662; 3,814,730 . . . ).

It can be carried out at a temperature from 20 to 200° C., preferably from 60 to 120° C., preferably with the aid of a platinum KARSTEDT catalyst (from 1 to 300 ppm, preferably from 5 to 50 ppm in weight of Pt). The relative quantities of polyalkylhydrogenosiloxane and allyl succinic anhydride corresponds to a stoechiometric excess of allyl succinic anhydride (at most 5 mols of allyl succinic anhydride per mol of SiH, preferably at most 2 mols of alpha alkenyl anhydride compound per mol of SiH).

The hydrolysis reaction can be carried out with water at a temperature ranging from room temperature to 150° C., preferably from 40 to 120° C., with or without catalysts. Suitable catalysts for the reaction can be Lewis acids such as $TiCl_4$, $ZnCl_2$, $MgCl_2$, or Bronstedt acids or bases such as $H_2SO_4$, HCl, KOH, $NaHCO_3$, in an amount ranging from 0.05 to 5%.

The novel dicarboxy functionalized polyorganosiloxanes of the present invention can be used for the water repellent treatment of surfaces such as glass, particularly inorganic surfaces or surfaces containing alkaline or earth-alkaline metal, such as ceramics, tilings, walls, wood, masonry.

The novel dicarboxy functionalized polyorganosiloxanes of the present invention can also be used as an anti-corrosion additive in an aqueous lubricant for the treatment of metal surfaces.

The dicarboxy functionalized polyorganosiloxanes can be incorporated in the aqueous lubricant at about 0.1 to 4% by weight, preferably from 0.3 to 1% by weight (in dry matter).

Usually, an aqueous lubricant comprises at least one saturated or unsaturated mono- or poly-carboxylic acid.

Preferably, the carboxylic acid contains a single carboxyl function. More particularly, it corresponds to the formula R—COOH; wherein R represents a linear or branched alkyl radical or an alkenyl radical containing one or more ethylenically unsaturated bonds, containing 5 to 40 carbon atoms, preferably 7 to 30 carbon atoms, optionally substituted with one or more hydroxyl radicals and/or at least one carboxylic function. Examples of preferred carboxylic acids are palmitic, behenic, stearic, isostearic, palmitoleic, oleic, petroselenic, erucic, linoleic, linolenic and ricinoleic acids.

Preferably, the carboxylic acid is in the form of a neutralized compound. The neutralizing agent is chosen among mineral or organic bases, which are advantageously water-soluble.

Non limiting examples of such mineral compounds are alkali metal hydroxides, hydroxycarbonates, carbonates and bicarbonates, and ammoniacal solution. Suitable organic bases that can be mentioned include primary, secondary or tertiary amines containing 1 to 40 carbon atoms, optionally substituted with one or more hydroxyl radicals, and/or one or more oxyalkylene groups. Said alkylene groups are preferably oxyethylene motifs. Further, the number of oxyalkylene motifs if present is 100 or less.

Preferably, the organic bases are chosen among amines, optionally comprising one or more hydroxyl groups, having at least three carbon atoms, linear, branched or cyclic, and having at least two primary and/or secondary amine functions, which are separated two by two, by 2 to 5 carbon atoms.

Aminoethylethanolamine, 1,2 diaminopropane, dimethylaminopropylamine, diethylenetriamine, methylpentamethylenediamine, 1,3 diaminopropane, tetraethylene pentamine, 1,4 diaminobutane, piperazine, 1,4diazabicyclo[222]octane, 1,2 diamino cyclohexane, tetramethylpropanediamine, are examples of such amines.

Preferably, the molar ratio of amine function to the carboxylic acid function is of at least 1, and advantageously at least 2. Preferably, and for economical reasons, the molar ratio is of at most 10.

Furthermore, the aqueous lubricants comprise at least one non-ionic surfactant and/or anionic surfactant.

Relating to non-ionic surfactants, the following compounds can be cited:

Polyalcoxylated alkyphenols
Polyalcoxylated mono-, di- and tri-(arylalkyl)phenols
Polyalcoxylated aliphatic alcohols
Polyalcoxylated mono-, di- and tri-glycerides
Polyalcoxylated sorbitan ester
Polyalcoxylated fatty amines, amides or amidoamines along or combined.

Preferably, the polyalcoxylated units (oxyethylene and/or oxypropylene and/or oxybutylene) are such that the value of the hydrophilic-lipophilic balance is of at least 12. As an illustration, the average number of oxyalkylene units is comprised between 2 and 100.

Relating to the anionic surfactants, phosphate esters, alkylester sulfonates, alkylbenzene sulfonates, alkylsulfates, alkylether sulfates, alkylamide sulfates and their mixtures, can be used in the aqueous lubricants.

Preferably, the anionic surfactant is chosen among the phosphate esters having the following formula, $[R(OA)_y]_x$-$P(=O)(OH)_{x'}$, in which formula R, which may or may not be identical, represents a hydrocarbon radical containing 1 to 30 carbon atoms, A is a linear or branched alkylene radical containing 2 to 4 carbon atoms, y, which is a mean value, is in the range 0 to 100, x and x' being equal to 1 or 2, provided that the sum of x and x' is 3.

More particularly, R is a saturated or unsaturated aliphatic, cycloaliphatic or aromatic hydrocarbon radical containing 1 to 30 carbon atoms. Preferably, radicals R, which may be identical or different, are alkyl or alkenyl radicals carrying one or more linear or branched ethylenically unsaturated bonds, containing 8 to 26 carbon atoms. Examples of such radicals that can in particular be cited are the stearyl, isostearyl, oleyl, linoleyl and linolenyl radicals. Further, radicals R, which may or may not be identical, can be aromatic radicals carrying alkyl, arylalkyl or alkylaryl substituents; these radicals contain 6 to 30 carbon atoms. Examples of such radicals that can be cited include nonylphenyl, mono-, di- and tri-styrylphenyl radicals.

More particularly, group OA corresponds to an oxyethylene, oxypropylene or oxybutylene radical or mixtures thereof. Preferably, said group corresponds to an oxyethylene and/or oxypropylene radical. Regarding the value of y, which is a mean value, it is preferably in the range 0 to 80.

The amounts of dicarboxy functionalized polyorganosiloxanes of the present invention, carboxylic acid, non-ionic and/or anionic surfactant, neutralizing agent, are such that the dry extract of the lubricants is of at least 10% by weight. More precisely, the dry extract is of 10 to 70% by weight.

It has to be noted that the lubricant can also comprise a buffering agent, in order to obtain a pH comprised between 7 and 9.

For instance, buffering agents such as monoamines, alcanolamines (ethanolamine, monoethanolamine), or phosphoric acid are used.

Finally, the aqueous lubricants can also comprise additives, generally at a total amount of at most 10% by weight based of the dry extract of the lubricant, that are conventional in this field such as preservatives, extreme-pressure additives, anti-foaming agents or stabilising agents.

It is also possible to add solid particles, such as wax particles or mono-, di- or tri-glyceride having a melting point preferably higher than 60° C.

In case these particles are present, the total amount is advantageously of at most 50% by weight of the dry extract of the lubricant.

The lubricant is prepared by mixing all the required ingredients, under agitation.

The temperature can be determined without any difficulty by the one skilled in the art. To give an example, the temperature is comprised between 20 and 90° C.

Usually, the aqueous lubricants are used after a dilution step, which is generally carried out by adding water, optionally comprising additives, to the lubricant.

The amount of added water is such that the dry extract of the lubricant is lower or equal to 5% by weight, and preferably comprised between 2 and 4% by weight.

The temperature at which the dilution is carried out corresponds generally to the ambient temperature.

The aqueous lubricants described above are used for metal deformation and transformation. The term "deformation" means the operations of drawing and rolling and the term "transformation operations" designates cutting metals.

The metals that can be subjected to such treatments are in particular and principally steels, stainless steels, aluminum, copper, zinc, tin, copper-based alloys (bronze, brass), etc.

The invention also encompasses a method for imparting anti-corrosion benefits to metal surfaces, by depositing, in the course of a metal deformation or transformation operation, an effective amount of dicarboxy functionalized polyorganosiloxane by means of an aqueous lubricant. It also encompasses the aqueous lubricant comprising the dicarboxy functionalized polyorganosiloxane.

The examples which follow are given by way of illustration.

EXAMPLE 1

Preparation of a dicarboxy functionalized polydimethylsiloxane having pendant —$(CH_2)_3$—$CH(COOH)$—$CH_2COOH$ groups.

93.7 g (i-e 0.67 mol) of allyl succinic anhydride, 52 g of toluene and 1.01 g of a Kardtedt catalyst solution (0.1% of Pt in hexamethyidisiloxane) are introduced into a 500 ml reactor.

The reaction mass is heated at 90° C.; 120 g (i-e 0.45 mol of SiH) of a polydimethylhydrogenosiloxane having the formula

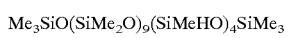

$Me_3SiO(SiMe_2O)_9(SiMeHO)_4SiMe_3$ and containing 3.75 mol of SiH/kg, are added over 3 hours.

The SiH amount (determined by gazometry) transformed at the end of the addition is of 96.1%; it is of 100% 2 hours after the end of the addition.

The volatiles are eliminated by evaporation under vacuum (3 mbar) over 10 hours at 150° C.

15 g of demineralized water are then added in order to hydrolyzed the succinic anhydride functions.

The hydrolysis reaction is followed by infra-red analysis (acid band at 1714 cm$^{-1}$, anhydride band at 1863 and 1782 cm$^{-1}$)

When the hydrolysis reaction is complete (48 hours), 100 g of toluene are added in order to azeotropically eliminate water.

133.5 g (corresponding to a yield of 82%) of a viscous oil are recovered. NMR analysis confirmed the following general structure of the product obtained:

$$Me_3SiO(SiMe_2O)_9(SiMeAO)_4SiMe_3$$

in which A represents $-(CH_2)_3-CH(COOH)-CH_2COOH$.

EXAMPLE 2

Preparation of a dicarboxy functionalized polydimethylsiloxane having pendant $-(CH_2)_3-CH(COOH)-CH_2COOH$ groups.

49.8 g (i-e 0.36 mol) of allyl succinic anhydride, 44 g of toluene and 1.139 g of a Kardtedt catalyst solution (0.1% of Pt in hexamethyldisiloxane) are introduced into a 500 ml reactor.

The reaction mass is heated at 90° C.; 150.3 g (i-e 0.266 mol of SiH) of a polydimethylhydrogenosiloxane having the formula $$Me_3SiO(SiMe_2O)_{100}(SiMeHO)_{15}SiMe_3$$

and containing 1.77 mol of SiH/kg, are added over 1 hour.

The SiH amount (determined by gazometry) transformed at the end of the addition is of 86%; it is of 100% 16 hours after the end of the addition.

The volatiles are eliminated by evaporation under vacuum (6 mbar) over 10 hours at 150° C.

101 g of toluene are added; the reaction mass is filtered.

6.7 g of demineralized water are then added in order to hydrolyzed the succinic anhydride functions.

The hydrolysis reaction is followed by infra-red analysis (acid band at 1714 cm$^{-1}$, anhydride band at 1866 and 1788 cm$^{-1}$)

When the hydrolysis reaction is complete (6 days), water is azeotropically eliminated.

146.3 g (corresponding to a yield of 80%) of a viscous oil are recovered. NMR analysis confirmed the following general structure of the product obtained:

$$Me_3SiO(SiMe_2O)_{100}(SiMeAO)_{15}SiMe_3$$

in which A represents $-(CH_2)_3-CH(COOH)-CH_2COOH$.

EXAMPLE 3

Water Repellent Treatment of Surfaces

A ceramic surface is used consisting of ceramic tiles, precleaned with ethanol.

A 50 μm thickness film of product of example 1 is deposited on the ceramic tiles using a bar coater ("tire film"). The treated ceramic tiles are either rinsed ("with rinsing") with pure water or not rinsed ("without rinsing").

A measurement of the contact angle between the water and the treated surfaces is then carried out on a Ramé-Hart assembly. It is expressed in degrees.

The values of the contact angle give information regarding the hydrophobic nature of the polymer. The results obtained are given below:

|  | Contact angle |
|---|---|
| Comparative (without treatment) | 36° |
| Treatment with the product of example 1 <<without rinsing >> | 65° |
| Treatment with the product of example 1 <<with rinsing>> | 45° |

What is claimed is:

1. A method of preparing the dicarboxy functionalized polyorganosiloxane said method comprising the steps of:

(a) hydrosilylating of a polyalkylhydrogenosiloxane having the formula:

$$R^1R^2R^3SiO(R^4R^5SiO)_p(R^6HSiO)_qSiR^3R^2R^1$$

wherein the different symbols have the same meaning as above defined, with allyl succinic anhydride with the aid of an effective amount of an hydrosilyation metal catalyst; and (b) hydrolyzing the anhydride functionalized polyorganosiloxane of step (a).

2. The process as defined in claim 1, wherein:

$R^1$ to $R^6$, are methyl,

P is from 5 to 200, q is from 1 to 50, and the number of Z and W end groups and the total number of X and Y end groups are in a ratio from 0/100 to 30/100.

3. The process according to claim 1, wherein the p/q ratio is from 1/3 to 99/1.

4. The process according to claim 2, wherein q is from 1 to 50 and the p/q ratio is from 1/1 to 10/1.

* * * * *